July 30, 1968  H. EILENBERG ET AL  3,394,469

FREEZING APPARATUS FOR FLUID SUBSTANCES

Filed June 14, 1966  2 Sheets-Sheet 1

Inventors:
Hanns Eilenberg
Walter Rembs
BY John E. Toupal
ATTORNEY

United States Patent Office 3,394,469
Patented July 30, 1968

3,394,469
FREEZING APPARATUS FOR FLUID SUBSTANCES
Hanns Eilenberg, Rosrath, and Walter Rembs, Rodenkirchen, Germany, assignors to Leybold-Heraeus-Verwaltung G.m.b.H., Cologne-Bayental, Germany
Filed June 14, 1966, Ser. No. 557,476
Claims priority, application Germany, June 16, 1965,
L 50,919
16 Claims. (Cl. 34—92)

ABSTRACT OF THE DISCLOSURE

Apparatus for forming frozen slabs of liquid material for drying in a freeze drying chamber includes a conveyer for material supports, the supports forming certain walls of the containers which receive the liquid material, and freezing elements which form other walls of the containers. Specifically, the side walls of the container are defined by confronting freezer plates which are movable relative to each other; and the bottom and end walls of the container are defined by a U-shaped support member which is suitably suspended from an overhead track. To form the container, the conveyer member is positioned between the freezing plates which are then moved toward each other to engage the edges of the support member, defining an open-topped container. A plurality of such containers may be defined in side-by-side relationship. The containers are filled with the liquid material which is then frozen by the freezing plates; and after freezing, the freezing plates are separated from the support members to release the support members and slabs for conveying to the drying chamber. A grid structure may be provided within the conveyer member to assist in supporting the slab during the drying process; and this grid structure may also be used as a heating element.

---

This invention relates generally to apparatus for freezing fluid substances and more particularly to such apparatus for use with freeze drying installations.

Freeze drying is a well known process in which a substance to be dried is first frozen and then placed within an evacuable chamber. Water vapor removal apparatus, such as, refrigerated condensers then absorb sublimating water vapor produced by heating of the frozen substance. A predetermined low pressure is continuously maintained within the vacuum chamber during the drying process by means of conventional vacuum pumps communicating with the chamber.

Physical and mechanical handling of the substance containers is one of the more costly required operations in a freeze drying process. Conventionally, these containers are first filled with the substance to be dried, and then placed within a freezing chamber wherein quick freezing of the substance is accomplished. Subsequently, the containers filled with the frozen substance are either physically or mechanically conveyed into a vacuum chamber in which the sublimation drying occurs. Finally, the dried product is removed from the containers and suitably packaged for commercial distribution after which the containers must be thoroughly cleaned before reuse.

Various schemes have been developed in attempts to reduce the relatively high substance handling costs in freeze drying processes. For example, there exist freeze drying methods wherein a frozen fluid substance ground into a fine powder is transported through a vacuum drying chamber as a thin layer supported by a suitable conveyor, such as a belt. However, the necessary granulation of the frozen substance and the relatively large vacuum chamber volume required relative to a given product output render these systems generally unsatisfactory.

Another freeze drying installation designed for reduced substance handling is shown and described in British Patent No. 936,054. The installation described in this patent provides a vacuum drying chamber enclosing vertically disposed, spaced apart heater plates between which are dried slabs of a frozen substance. The frozen slabs are supported by container devices which are completely open on their ends facing the heating surfaces of the vertically disposed heater plates. Thus, during the drying process a dried outer layer will fall from the still frozen slab core either freely or under the influence of a suitable scraping or agitating mechanism. While this particular type installation eliminates many of the problems associated with emptying and cleaning of the substance containers after completion of the drying process, it does not alleviate the problems associated with the freezing steps required prior to the drying process. In fact, handling of the substance containers between the freezing and drying steps is made more difficult since the substance containers must be supported in a horizontal position during the freezing operation and in a vertical position during the drying operation.

The object of this invention, therefore, is to provide an improved freeze drying installation which reduces product costs by simplifying the handling of the processed substance both during the freezing and drying segments of the process.

One feature of this invention is the provision of a freezing apparatus especially suited for freezing fluid substances and including within a freezing chamber a plurality of vertically disposed freezing plates which are relatively movable in a direction perpendicular to their vertical surfaces. In a closed position the vertical surfaces of the freezing plates form end walls of a container which is filled from a suitable supply with a fluid substance to be frozen. A plurality of fluid substance supports are mounted between the adjacent freezing plates and within the containers formed thereby so as to support the frozen substance slabs after movement of the freezer plates to an open position which permits removal of the slabs by movement in a direction parallel to the freezer plates.

Another feature of this invention is the provision of a freezing apparatus of the above featured type which is associated with a vacuum drying chamber enclosing a plurality of vertically disposed, spaced apart heating plates and including guides which support the substance supports and guide movement thereof between the freezing and vacuum drying chambers.

Another feature of this invention is the provision of a freezing apparatus of the above featured type wherein the spacing between the vertically disposed heating plates is between 10 and 40 millimeters greater than the spacing between the vertically disposed freezing plates when in the closed position. This spacing establishes a desirable removal gap of between 5 and 20 millimeters between the surfaces of the heater plates and frozen slabs after positioning thereof in the vacuum drying chamber.

Another feature of this invention is the provision of a freezing apparatus of the above featured types wherein the fluid substance supports included U-shaped retainer walls of substantially uniform width and having edges adapted to engage the surfaces of the vertically disposed freezing plates when in a closed position. In addition to supporting the frozen substance slab, these U-shaped retainer walls function as the bottom and other end walls of the container which is filled with the fluid to be frozen.

Another feature of this invention is the provision of a freezing apparatus of the above featured type wherein the edges of the U-shaped retainer walls are resilient so as to conform to the surfaces of the vertically disposed freezer plates upon engagement therewith. This permits the attainment of a good seal between the U-shaped retainer walls and the freezer plate surfaces providing a leak tight fluid container.

Another feature of this invention is the provision of a freezing apparatus of the above featured types wherein the fluid substance supports include grid members attached to the U-shaped retainer walls so as to be substantially parallel to the surfaces of the vertically disposed freezer plates when positioned therebetween. The grid members provide structural stability and prevent crumbling or disintegration of the frozen slab.

Another freature of this invention is the provision of a freezing apparatus of the above featured type wherein the grid members are formed by resistive heater wires thereby enabling them to function as heat sources upon energization with a resistive heating current.

These and other features and objects of the present invention will become more obvious upon a perusal of the following specification taken in conjunction with the accompanying drawings wherein.

Figure 1:
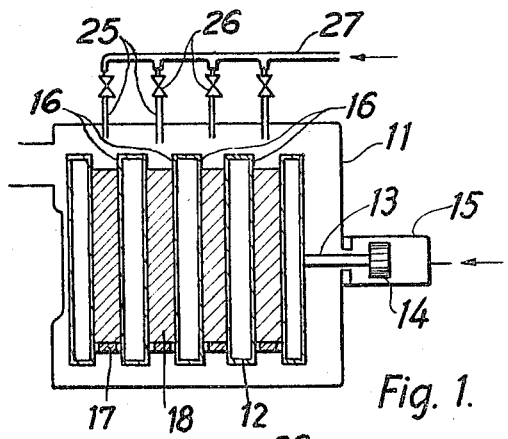
FIG. 1 is a schematic illustration of a preferred freezing chamber embodiment of the present invention showing the vertically disposed freezer plates in a closed position.
Figure 2:
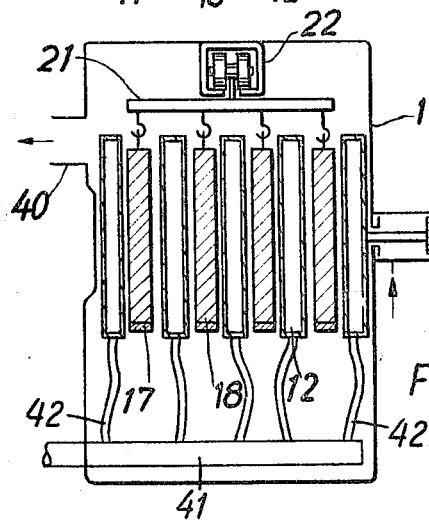
FIG. 2 is a schematic illustration showing the vertically disposed freezer plates of FIG. 1 in an open position.
Figure 3:
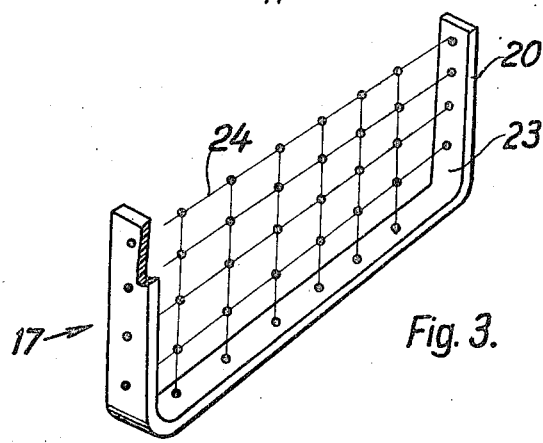
FIG. 3 is a schematic illustration of a preferred substance support embodiment for use in the freezing chamber of FIGS. 1 and 2.

Referring now to FIG. 1, there are shown the plurality of vertically disposed, spaced apart freezer plates 12 positioned within the freezing chamber 11. Connected to the freezer plates 12 by the drive shaft 13 is the piston 14 of the hydraulic cylinder 15. The freezer plates 12 are mounted so as to permit relative movement therebetween in a direction perpendicular to their flat vertical surfaces 16 when actuated by the hydraulically operated drive shaft 13. As best shown in FIG. 2, the freezer plates 12 may be in the form of hollow boxes adapted to have circulated therethrough a suitable refrigerating medium such as brine. Suitable inlet and outlet conduits for the freezer plates may take the form, for example, of an inlet header 41 and flexible conduits 42 communicating the inlet header with the several freezer plates to accommodate the movement of the plates relative to the header. The substance supports 17 support the substance slabs 18 in the parallel spaces between the vertical surfaces 16 of the freezer plates 12. As shown only in FIG. 2, the substance supports 17 are suspended from a common overhead carrier 21 which is movably supported from the top of the freezing chamber 11 by the guide rail 22 so as to permit movement of the carrier 21 and substance supports 17 in a direction parallel to the vertical freezer plate surfaces 16. As shown more clearly in FIG. 3, the substance supports 17 include the U-shaped retainer wall 23 and grid member 24 which is attached so as to assume a symmetrical position between the freezer plates 12.

During operation of the freezing chamber, the substance supports 17 are attached to the common carrier 21 which is driven either manually or by suitable mechanical devices (not shown) along the guide rail 22 and into the freezing chamber 11 through a suitable door (not shown). With the substance supports 17 positioned between the freezer plate surfaces 16, the hydraulic cylinder 15 is actuated by a conventional hydraulic system (not shown) causing horizontal movement of the freezer plates 12 and reduction in the spacing between the vertical surfaces 16 until the closed position illustrated in FIG. 1 is attained. There then exist substance containers having end walls formed by the vertical freezer plate surfaces 16 and bottom and other end walls formed by the U-shaped retaining members 23. Subsequently, a given fluid substance to be frozen is poured into the substance containers from the supply pipes 25, shown only in FIG. 1, which extend into the freezing chamber 11 directly above the substance containers. The supply pipes 25 are connected by valves 26 to a common supply line 27 which communicates with a suitable fluid substance supply tank (not shown). The fluid substance within the containers is then frozen into solid slabs 18 by the freezing plates 12 which are cooled in a conventional manner. It is also possible to fill the containers with fluid substance before complete closing of the freezer plates 12 and before contact thereof with the edges of the substance supports 17. Then during the freezing process the freezer plates 12 can be moved completely closed to thereby compress the enclosed fluid substance.

Figure 4:
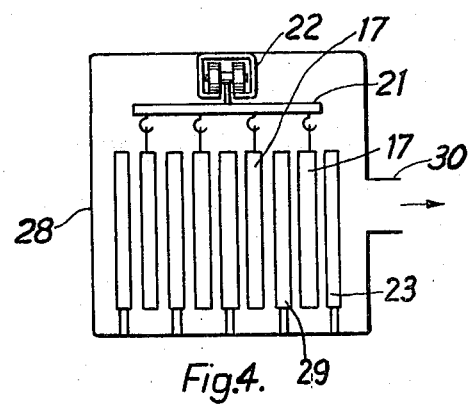
FIG. 4 is a schematic illustration of a vacuum drying chamber for use with the freezing chamber of FIGS. 1 and 2.

Upon completion of the freezing process, the hydraulic cylinder 15 is actuated to induce separation of the freezing plates 12 into the open position illustrated in FIG. 2. The common carrier 21 and suspended frozen slabs 18 are then conveyed along the guide rail 22 which extends from the freezing chamber 11 into the vacuum drying chamber 28 shown in FIG. 4. The vacuum chamber 28 encloses a plurality of vertically disposed heater plates 29 and communicates via the evacuation line 30 with suitable vacuum pumps (not shown). Thus, after positioning of the frozen substance slabs 18 between the vertical heating surfaces of the adjacent heater plates 29 and evacuation of the vacuum chamber 28, the well known freeze drying process can be accomplished.

The freezing chamber 11 and the vacuum drying chamber 28 can be distinct and separate units joined only by the guide rail 22 which permits movement therebetween of the carrier 21 and attached substance supports 17. However, these chambers can also be formed as an integral unit separated by a movable wall portion (not shown) which permits both communication between and isolation of the adjoining chambers. Such chambers and associated substance conveyors can be, for example, as shown in U.S. Patent No. 3,354,609, issued Nov. 28, 1967.

After completion of the freeze drying process, the dried product can be removed from the substance supports 17 by suitable, well known mechanical devices such as by shakers, vibrators, contacting brushes, etc. The product removal can occur, for example, as shown in the above noted U.S. Patent No. 3,354,609, in an output lock (not shown) which can be isolated from the vacuum drying chamber 28. The removal process can also occur within the vacuum chamber 28 itself after flooding thereof with air or a protective gas such as nitrogen. Furthermore, in some applications it may be desirable to continuously remove the dried external layers from the frozen slabs 18 thereby continuously exposing a frozen surface. In this way the time required for complete drying of the frozen slab 18 can be substantially reduced.

In another desirable embodiment of the invention, the U-shaped retaining wall 23 can be formed of a suitable resilient material such as Teflon so as to possess edges 20 which will deform upon contact with the freezer plate surfaces 16. In this way a fluid tight seal can be obtained which will prevent leakage of the fluid substance from the fluid container along the joints between the U-shaped member 23 and the freezer plate surfaces 16. In other useful embodiments of the invention, the grid member 24 can be replaced with sheets of apertured metal or plastic or can itself be formed of a suitable food substance which upon completion of the drying process can be maintained and used with the dried slab 18.

The dimensions of the frozen slab 18 will, of course, vary according to application but in general can have a surface area of about ½ square meter and a thickness of between 1 and 5 centimeters. However, in any case it is important that the clearance between the frozen slab 18 and the adjacent heater plates 29 be large enough to permit escape of water vapor and small enough to provide effective heat transfer. These considerations establish a desirable spacing between heater plates and frozen tablets of between 5 and 20 millimeters. Accordingly, with the freeze drying installation embodiment illustrated in FIGS. 1–4, the spacing between the heater plates 29 in the drying chamber 28 should be between 10 and 40 millimeters greater than the thickness of the frozen slabs 18 which is, of course, established by the spacing between the vertical surfaces 16 with the freezer plates 12 in the closed position.

Figure 5:
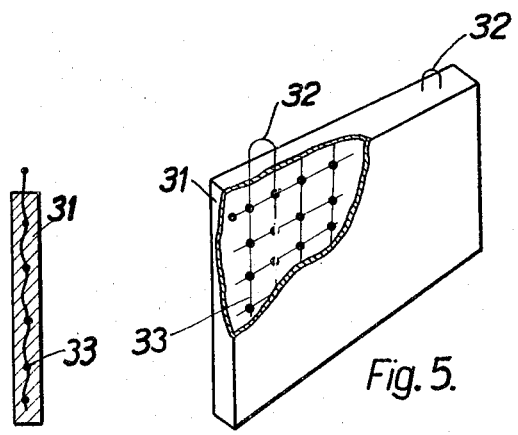
FIG. 5 is a schematic illustration of another preferred fluid substance support embodiment.

FIG. 5 shows another substance support embodiment which eliminates the U-shaped member 23 and supports the frozen substance slab 31 only with the grid member 33 having hooks 32 for attachment to the common carrier 21 of FIG. 2. In this embodiment, the freezer plate surfaces 16 can be provided with perpendicularly extending wall portions (not shown) which, upon movement of the freezer plates 12 to the closed position, form the bottom and other end walls of the fluid substance containers. Thus, after movement of the freezer plates 12 to the open position, the frozen slabs 31 will be completely exposed and supported only by the grid members 33. Here, it can be desirable to form the grid members 33 of resistive heater wire and to provide within the drying chamber 28 a suitable source of electrical current (not shown) for connection to the attachment hooks 32. Then, after movement of the frozen slabs 31 into the drying chamber 28, an electrical heating current can be circulated through the grid members 33 producing resistive heating which encourages sublimation of the frozen substance. This resistive heating can provide the only source of sublimation inducing heat or can be used to supplement the heat furnished by the heater plates 29.

Figure 6:
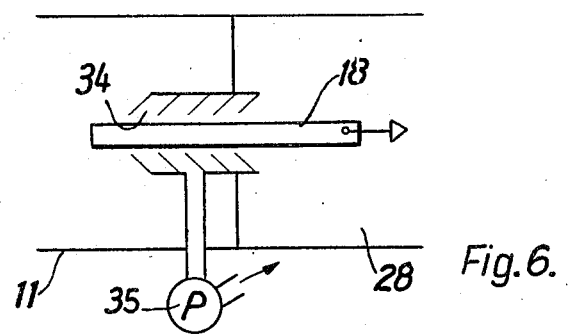
FIG. 6 is a schematic illustration of a preferred lock arrangement for use between the freezing and vacuum drying chambers shown in FIGS. 1 and 4.

FIG. 6 shows another invention embodiment wherein the freezing chamber 11 and the drying chamber 28 are connected by a series of differential pressure locks 34 each having an opening which closely conforms to a frozen substance slab 18. One or more of the differential pressure lock chambers 34 can be connected to a suitable vacuum pump 35 which permits evacuation thereof. In this embodiment, conventional conveyor devices (not shown) can be used to continuously or intermittently feed substance slabs 18 from the freezing chamber 11 into the drying chamber 28 and the pressure differential between the evacuated drying chamber 28 and freezing chamber 11 can be distributed through the series connected differential pressure locks 34. Thus, a completely closeable door assembly between the freezing chamber or inlet lock chamber 11 and the drying chamber 28 is not required.

For some applications it may be desirable to perform both the freezing and drying steps in a single chamber. In this case, the freezer plates 12 can be adapted for sequential use, initially as freezing plates for use during the freezing process and subsequently as heating plates for use during the drying process. Here, the freezing chamber 11 can be adapted for evacuation and connected to suitable vacuum pumps (not shown) by an evacuation line 40.

Obviously, many modifications and variations of the present invention are possible in light of the above teachings. It is, therefore, to be understood that within the scope of the appended claims the invention may be practiced otherwise than as specifically described.

What is claimed is:

1. A freezing apparatus for freezing fluid substances and comprising; a freezing chamber, a plurality of adjacent freezing plates having substantially flat vertical surfaces supported within said freezing chamber, drive means adapted to move said adjacent freezing plates into open and closed positions by producing relative movement therebetween in a direction perpendicular to said vertical surfaces, a plurality of fluid substances supports which, together with the freezing plates, define a container for the fluid substance during freezing and a support for the fluid substance after freezing, movable mounting means adapted to support said fluid substance supports between said adjacent freezing plates and to permit relative movement therebetween in a direction substantially parallel to said vertical surfaces, said vertical surfaces adapted in said closed position of said freezing plates to form end walls of fluid container means which comprise said fluid substance supports, and supply means positioned within said freezing chamber and adapted to supply a fluid substance into said fluid substance container means.

2. A freezing apparatus according to claim 1 wherein each of said fluid substance supports comprise a U-shaped retainer wall of substantially uniform width and having edges adapted in said closed position to engage said vertical surfaces thereby forming bottom and other end walls of said fluid container means.

3. A freezing apparatus according to claim 2 wherein said fluid substance supports further comprise grid members attached to said U-shaped retainer walls and adapted to be substantially parallel to said vertical surfaces when positioned therebetween.

4. A freezing apparatus according to claim 3 wherein said grid members are formed by resistive heater wires.

5. A freezing apparatus according to claim 3 wherein said edges of said U-shaped retainer walls are resilient so as to conform to said vertical surfaces upon engagement therewith.

6. A freezing apparatus according to claim 3 wherein said movable mounting means comprises a common support for supporting all of said fluid substance supports and adapted for movement in a direction parallel to said vertical surfaces.

7. A freezing apparatus according to claim 1 wherein said fluid substance supports comprise grid members adapted to be substantially parallel to said vertical surfaces when positioned therebetween.

8. A freezing apparatus according to claim 1 wherein said movable mounting means comprises a common support for supporting all of said fluid substance supports and adapted for movement in a direction parallel to said vertical surfaces.

9. A freezing apparatus according to claim 1 including a vacuum drying chamber, vacuum pump means connected to said vacuum drying chamber, a plurality of spaced apart heating plates positioned within said vacuum drying chamber, said heating plates having substantially vertically parallel heating surfaces, means for isolating said vacuum drying chamber from said freezing chamber, and guide means for supporting said movable mounting means and adapted to guide movement thereof between said freezing chamber and said vacuum drying chamber.

10. A freezing apparatus according to claim 9 wherein the spacing between said heating plates is between 10 and 40 millimeters greater than the spacing between said freezing plates when in said closed position.

11. A freezing apparatus according to claim 10 wherein each of said fluid substance supports comprise a U-shaped retainer wall of substantially uniform width and having edges adapted in said closed position to engage said vertical surfaces thereby forming bottom and other end walls of said fluid container means.

12. A freezing apparatus according to claim 11 wherein said fluid substance supports further comprise grid members attached to said U-shaped retainer walls and adapted to be substantially parallel to said vertical surfaces when positioned therebetween.

13. A freezing apparatus according to claim 12 wherein said movable mounting means comprises a common support for supporting all of said fluid substance supports and adapted for movement in a direction parallel to said vertical surfaces.

14. A freezing apparatus according to claim 9 wherein each of said fluid substance supports comprise a U-shaped retainer wall of substantially uniform width and having edges adapted in said closed position to engage said vertical surfaces thereby forming bottom and other end walls of said fluid container means.

15. A freezing apparatus according to claim 14 wherein said movable mounting means comprises a common support for supporting all of said fluid substance supports and adapted for movement in a direction parallel to said vertical surfaces.

16. A freezing apparatus according to claim 15 wherein said fluid substance supports further comprise grid members attached to said U-shaped retainer walls and adapted to be substantially parallel to said vertical surfaces when positioned therebetween.

References Cited

UNITED STATES PATENTS

| | | | |
|---|---|---|---|
| 1,822,089 | 9/1931 | Hall | 62—341 |
| 2,853,796 | 9/1958 | Sanders | 34—5 |
| 3,289,314 | 12/1966 | Porta | 34—5 |

ROBERT A. O'LEARY, *Primary Examiner.*

W. E. WAYNER, *Assistant Examiner.*